No. 851,863. PATENTED APR. 20, 1907.
C. E. BUELL.
FIRE EXTINGUISHER.
APPLICATION FILED APR. 20, 1892.
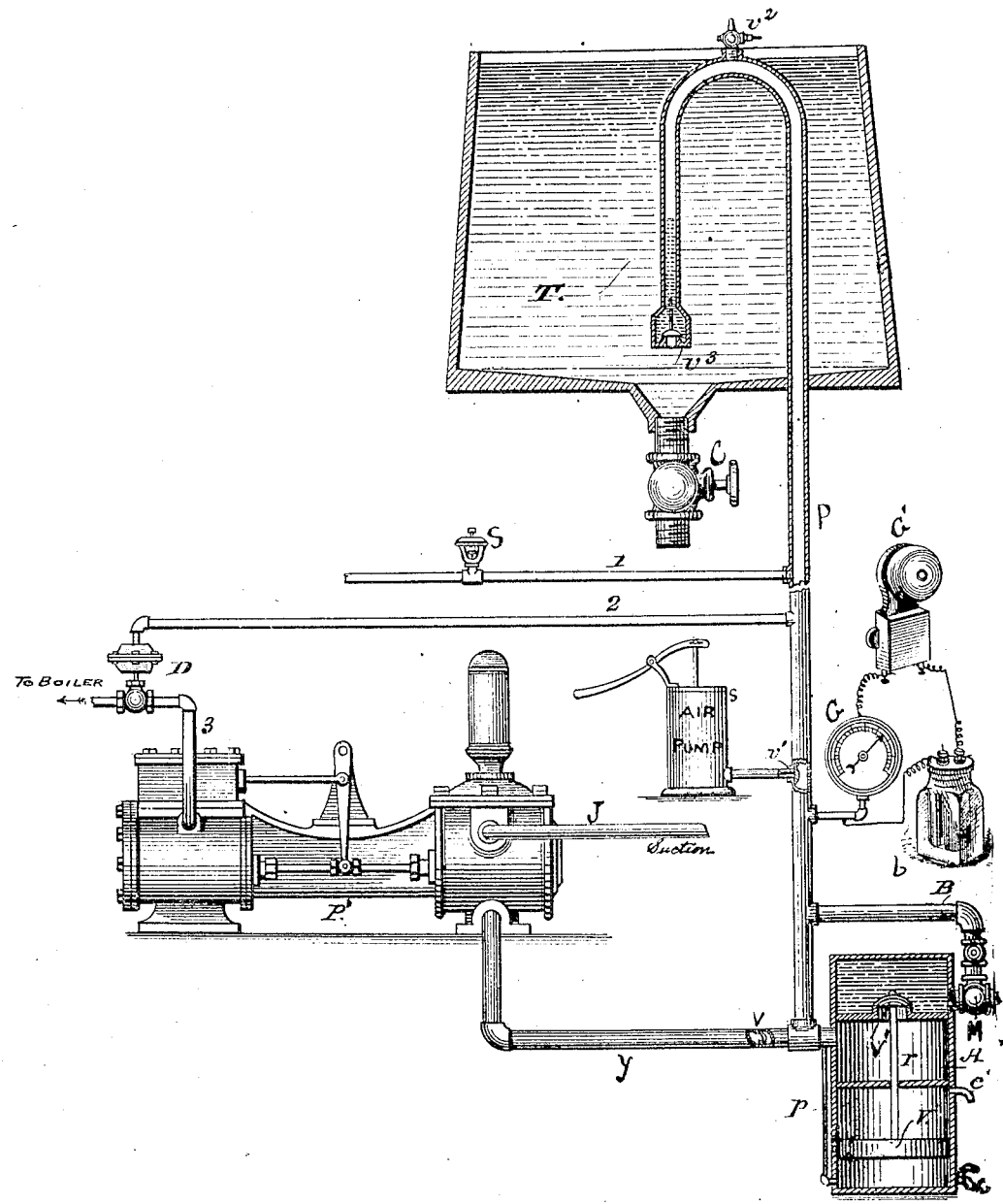
Witnesses
Fred G. Dieterich
William C. Buell
Inventor
Charles E. Buell

UNITED STATES PATENT OFFICE.

CHARLES E. BUELL, OF NORTH PLAINFIELD, NEW JERSEY, ASSIGNOR TO GENERAL FIRE EXTINGUISHER COMPANY, OF NEW YORK, N. Y., A CORPORATION OF NEW YORK.

FIRE-EXTINGUISHER.

No. 851,863.

Specification of Letters Patent.

Patented April 30, 1907.

Application filed April 20, 1892. Serial No. 429,825.

*To all whom it may concern:*

Be it known that I, CHARLES E. BUELL, of North Plainfield, Somerset county, State of New Jersey, have invented Improvements in Fire-Extinguishing Apparatus, of which the following is a specification.

My invention consists, primarily, in the combination with a sprinkler system of a tank located above the sprinklers a siphon in the connection between the tank and sprinkler pipes, with a gaseous pressure for normally holding the water from the tank entering the system, and an auxiliary water supply, as a power pump, and an aqueduct connected to the system, but normally turned off, and valvular mechanism adapted to be made operative by the admission of water from the tank to turn on the auxiliary supply, substantially as hereinafter described.

My invention consists further in certain combinations and sub-combinations to be herein-after described.

The accompanying drawing shows a tank located above the sprinkler pipes and connected therewith by the riser P. which includes the siphon bend that terminates in the valve $v^3$. for preventing overflow of the tank when an auxiliary supply is turned on. There is shown a vent at the highest point of the siphon marked $v^2$, and a draw-off cock C. to draw off the sediment in the bottom of the tank.

The riser P. is connected to the valvular mechanism A. that comprises a casing containing the piston V. which is joined to the valve V'. by the rod $r$., and a partition divides the casing into two chambers. A small pipe $p$. leads from the lower point of riser P. to beneath the piston V. in the lower chamber, and when water fills the riser P. the water will enter beneath piston V. and lift said piston and the connected valve V'., and admit water from main M. into the upper chamber of the casing and into the riser P. By means of a by-pass B and suitable controlling valves, the water from main M. can be let directly into the pipes of the system by hand.

Connected to the riser P is a distributing branch 1 provided with an automatic sprinkler S.

The water is normally excluded from the riser P. by air pressure from the connected air pump $s$, but when a sprinkler opens the pressure is destroyed and the water in tank T. rises in the siphon and flows into riser P. and the pipes of the system and by its weight and pressure opens the waterway between main M. and riser P. thus admitting an auxiliary water supply to enter the system under greater pressure for supplying the opened sprinklers. A check valve $v^3$. at the open end of the siphon prevents an overflow of the tank, as mentioned. By this means a second source of water supply is automatically turned on at the moment that such a supply is needed.

A pipe is shown connecting the steam pump to the system for furnishing a pump supply as a third source of water supply, or when an aqueduct is not at hand the pump supply becomes the second source of supply, the tank, or local supply being the first, or primary source.

A pipe 2. leads from riser P. to the pipe 3 which supplies steam to the pump P' and has a diaphragm D. at its terminal and the pressure of water in riser P. acting through the diaphragm D. forces down a gate valve and admits steam to automatically start the pump P' and deliver water through the pipe $y$ to the riser P and to the system of sprinkler pipes. The pipe $y$ is provided with a check valve $v$ and the discharge pipe of pump $s$ is provided with a check valve $v'$ to prevent the water in the main riser from entering the pumps P' and $s$. Pump P'' is provided with the usual suction pipe $j$.

An alarm apparatus is shown connected to riser P. A gage G. provided with a contact stop controls the circuit of the battery $b$., and when the pressure of water is present in riser P. the index hand of gage G. closes the normally open circuit and sounds an alarm on the gong G' that is included in the circuit.

I do not claim herein the combination with a siphon in the connection between a tank located above a sprinkler system and the distributing pipes, of an auxiliary supply and agencies for utilizing the siphon, as that is disclosed in the subject matter of my patents No. 548,742 dated October 29th 1895, and 572,404, dated December 1, 1896.

What I claim, is:—

1. In an automatic sprinkler system, the combination with the supply pipe leading from the local supply to the distributing pipes, of an auxiliary supply valve arranged to be operated by pressure of water from the pipes leading from the local supply to the distributing pipes.

2. The combination with a system of sprinklers of a local supply, connections from said local supply to the distributing pipes, means for introducing gaseous pressure into the distributing pipes, connections from the distributing pipes to an auxiliary supply, and a valve controlling the said auxiliary supply that is arranged to be operated by pressure of water from the local supply.

3. In an automatic sprinkler system a local supply having connections to a main riser of the system, gaseous pressure in the system, an auxiliary supply connected to the main riser, a valve controlling the auxiliary supply that is arranged to be operated by the pressure of water from the local supply.

4. A system of sprinklers, a tank located above the system, connections from said tank to said system that comprise a siphon, gaseous pressure in the system, an auxiliary supply for said system and a valve for controlling the said auxiliary supply that is adapted to be operated by pressure of water from said tank.

5. A system of sprinklers, a tank located above said sprinklers, a siphon between the tank and sprinklers, an auxiliary supply for the sprinklers that is normally turned off, and a valve operated by the pressure of the tank to turn on the auxiliary supply when a sprinkler is opened.

6. A system of sprinklers, a tank located above the sprinklers, a siphon between said tank and sprinklers gaseous pressure normally holding the water from the said tank from entering into the pipes of the system, an auxiliary water supply that is normally turned off, and a valve controlling the same that is adapted to be operated by the pressure from the tank to turn on the auxiliary supply when a sprinkler opens.

7. A system of sprinklers, a local supply, a gaseous pressure in said system, an auxiliary supply connected to the said system that includes a power pump, and a valve for turning on the auxiliary supply by the pressure of water of the local supply.

8. A system of automatic sprinklers, a local supply, gaseous pressure normally restraining the water of the local supply from entering the system, an auxiliary supply that is normally prevented from entering the system by a valve that is adapted to be operated to turn on the auxiliary-supply by the pressure of water from the local supply, and an alarm apparatus having connections to the system, and that is made operative by the discharge of the gaseous pressure when a sprinkler opens.

CHARLES E. BUELL.

Witnesses:
   JENNIE L. DEMAREST,
   THOMAS H. PETERSON.